(12) United States Patent
Xu

(10) Patent No.: US 7,724,662 B2
(45) Date of Patent: *May 25, 2010

(54) DYNAMIC RATE LIMITING ADJUSTMENT

(75) Inventor: Fan Xu, Santa Clara, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 11/998,654

(22) Filed: Nov. 30, 2007

(65) Prior Publication Data

US 2008/0089232 A1  Apr. 17, 2008

Related U.S. Application Data

(63) Continuation of application No. 10/198,703, filed on Jul. 17, 2002, now Pat. No. 7,310,309.

(51) Int. Cl.
*G01R 31/08* (2006.01)

(52) U.S. Cl. ............... 370/230.1; 370/235; 370/232

(58) Field of Classification Search ............ None
See application file for complete search history.

(56) References Cited

U.S. PATENT DOCUMENTS

| | | | |
|---|---|---|---|
| 6,046,979 A | 4/2000 | Bauman | 370/229 |
| 7,068,602 B2 * | 6/2006 | Davari et al. | 370/232 |
| 7,310,309 B1 * | 12/2007 | Xu | 370/230.1 |
| 2003/0035374 A1 | 2/2003 | Carter et al. | 370/235 |
| 2003/0107988 A1 * | 6/2003 | Lodha et al. | 370/229 |
| 2003/0223369 A1 | 12/2003 | Anderson | 370/235 |
| 2003/0223370 A1 | 12/2003 | Jain et al. | 370/235 |
| 2003/0227872 A1 | 12/2003 | Tundlam et al. | 370/232 |
| 2006/0209693 A1 * | 9/2006 | Davari et al. | 370/232 |

OTHER PUBLICATIONS

Notice of Allowance issued in U.S. Appl. No. 10/198,703, dated Oct. 2, 2007.
Office Action issued by USPTO in U.S. Appl. No. 10/198,703 dated Jul. 28, 2006.
Office Action issued by USPTO U.S. Appl. No. 10/198,703 dated Feb. 13, 2007.

* cited by examiner

*Primary Examiner*—Duc C Ho
(74) *Attorney, Agent, or Firm*—Nixon Peabody LLP; John P. Schaub

(57) ABSTRACT

Dynamic rate limiting adjustment may be provided by sampling actual output rates from a rate limited device and utilizing this information to modify configured traffic limits. This allows the device to achieve actual output rates much closer to the desired rate limits for users and services.

20 Claims, 10 Drawing Sheets

| Traffic Class Credit Registers at 0x1280000 - 0x1280200 | | | | Notes |
|---|---|---|---|---|
| 0x00000FFF | 0x00000FFF | 0x00000FFF | 0x00000FFF | ⇐Traffic Class No. 1 – 4 |
| 0x00000FFF | 0x00000FFF | 0x00000FFF | 0x00000FFF | ⇐Traffic Class No. 5 – 8 |
| 0x00000024 | 0x00000FFF | 0x00000FFF | 0x00000FFF | ⇐Traffic Class No. 9-12 |
| 0x00000FFF | 0x00000FFF | 0x00000FFF | 0x00000FFF | ⇐Traffic Class No. 13-16 |
| 0x00000FFF | 0x00000FFF | 0x00000FFF | 0x00000FFF | ⇐Traffic Class No. 17-20 |
| 0x00000FFF | 0x00000FFF | 0x00000FFF | 0x00000FFF | ⇐Traffic Class No. 21-24 |
| 0x00000FFF | 0x00000FFF | 0x00000FFF | 0x00000FFF | ⇐Traffic Class No. 25-28 |
| 0x00000FFF | 0x00000FFF | 0x00000FFF | 0x00000FFF | ⇐Traffic Class No. 29-32 |
| .......... | .......... | .......... | .......... | .......... |
| 0x00000FFF | 0x00000FFF | 0x00000FFF | 0x00000FFF | ⇐Traffic Class No.109-112 |
| 0x00000FFF | 0x00000FFF | 0x00000FFF | 0x00000FFF | ⇐Traffic Class No.113-116 |
| 0x00000FFF | 0x00000FFF | 0x00000FFF | 0x00000FFF | ⇐Traffic Class No.117-120 |
| 0x00000FFF | 0x00000FFF | 0x00000FFF | 0x00000FFF | ⇐Traffic Class No.121-124 |
| 0x00000FFF | 0x00000FFF | 0x00000FFF | 0x00000FFF | ⇐Traffic Class No.125-128 |

DYNAMIC RATE LIMITING ADJUSTMENT

CROSS-REFERENCE TO RELATED APPLICATIONS

This application is a continuation of prior U.S. patent application Ser. No. 10/198,703, entitled "Dynamic Rate Limiting Adjustment," filed on Jul. 17, 2002, now U.S. Pat. No. 7,310,309.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of web switches. More particularly, the present invention relates to dynamically adjusting rate limiting on a switch or router.

BACKGROUND OF THE INVENTION

Rate limiting involves the setting and implementation of traffic rates such that users or services may not utilize more bandwidth then they have been apportioned. This is especially useful in selling varying levels of traffic allowances to users depending upon how much they want to spend and what services they typically use.

These traffic rates are commonly set by an ISP and the switches within the network have access to these traffic rates, and limit usage accordingly. This may be accomplished by dividing a second into many time intervals, converting the configured rate into credits for each interval, and decrementing the credits for each packet sent or received. However, this mechanism lacks effectiveness in the real world as often the actual rate of traffic flow for a particular user or service varies from the configured limit due to a number of factors. A credit cannot be partially consumed, thus the amount of bandwidth used in a given cycle may be artificially less than or greater than the configured limit. While this may not present a major problem in any particular cycle, over time this variation can become much more pronounced. Additionally, traffic does not always arrive on a consistent basis. A large amount of traffic may arrive in one cycle, only to have none arrive in the next cycle. In this case, the traffic arriving in the first cycle may be subject to the rate limit and packets may be dropped. This leads to an overall rate over the two cycles being perhaps significantly less that the desired rate limit. Furthermore, the application sending the packets, such as a Transmission Control Protocol (TCP) application, may automatically slow down its rate of sending packets when packets get dropped by the switch. These factors result in actual traffic rates varying significantly from configured rates.

Thus, what is needed is a solution which does not suffer from the drawbacks of prior solutions.

BRIEF DESCRIPTION OF THE INVENTION

Dynamic rate limiting adjustment may be provided by sampling actual output rates from a rate limited device and utilizing this information to modify configured traffic limits. This allows the device to achieve actual output rates much closer to the desired rate limits for users and services.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 2 is a diagram illustrating a table holding traffic class credit information in accordance with a specific embodiment of the present invention.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Dynamic rate limiting adjustment may be provided by sampling actual output rates from a rate limited device and utilizing this information to modify configured traffic limits. This allows the device to achieve actual output rates much closer to the desired rate limits for users and services.

Figure 1:
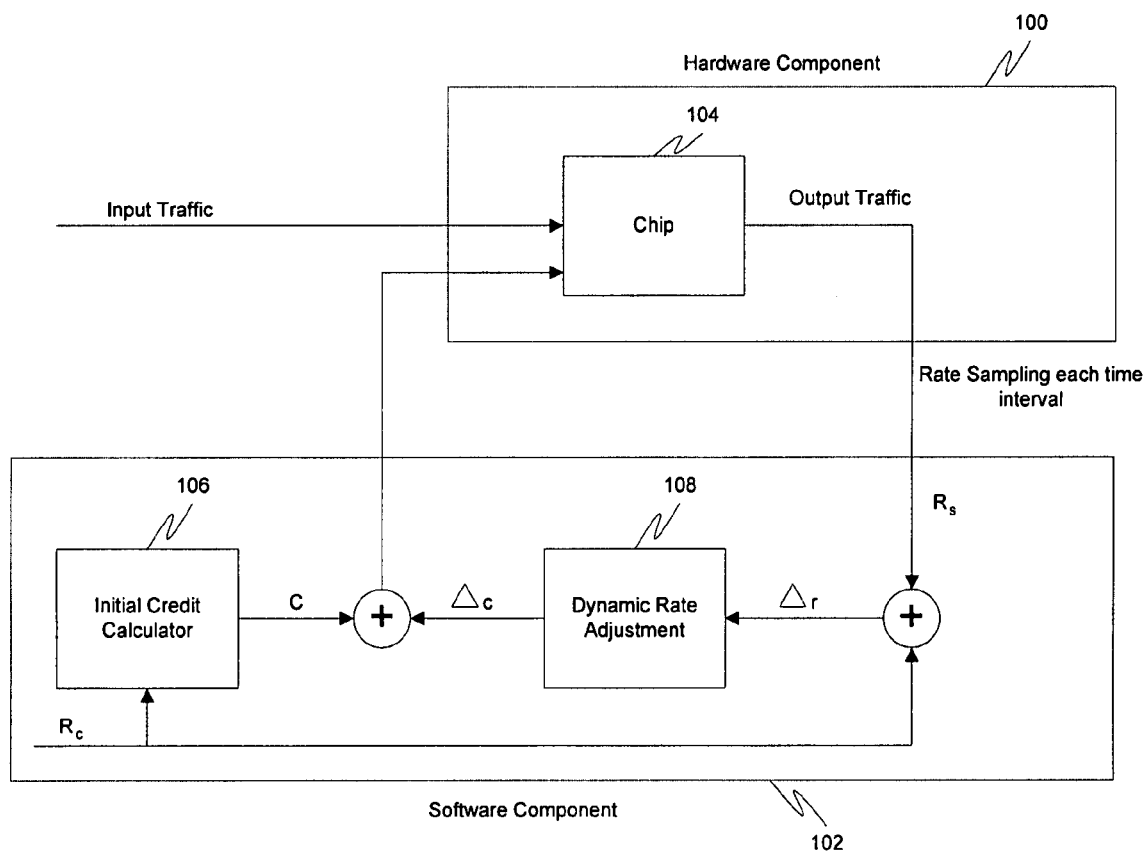
FIG. 1 is a block diagram illustrating a system for dynamically limiting the rate of a traffic type through a network device in accordance with a specific embodiment of the present invention.

In a specific embodiment of the present invention, the overall rate limiting system may comprise two components: a hardware component and a software component. However, one of ordinary skill in the art will recognize that either component may be implemented in hardware or software. Additionally, the present invention may be viewed as an add-on component to a preexisting hardware rate limiting device. FIG. 1 is a block diagram illustrating a system for dynamically limiting the rate of a traffic type through a network device in accordance with a specific embodiment of the present invention. It may comprise a hardware component 100 and a software component 102.

In a specific embodiment of the present invention, the hardware component is a credit based system which allows up to 128 different traffic classes to be defined in each chip 104. A credit is a hardware token, which is worth a fixed number of bytes. The traffic rate for a defined class is set by software. A time interval I and a credit value $C_s$ can be set for each chip. The software component 102 may then assign a number of credits C for each traffic class using an initial credit calculator 106 and forward it to the hardware component 100. A traffic class may be associated with a physical port, an outgoing queue for a physical port, or a particular flow pattern defined by an access control list (ACL) group. At the end of each interval time, the hardware may scan all applicable traffic classes and either add or store C into a counter K for each class. The decision to add or store C depends in which mode the chip is designed to run: accumulated mode or fixed mode. In accumulated mode, any unused credits at the end of an interval time are carried over to the next interval, whereas in fixed mode, any unused credits at the end of an interval time are lost. For example, assume five credits should be given at the beginning of each interval based on the rate configured and only three credits are actually used by the end of the interval. In accumulated mode, five more credits will be added to the remaining two credits for a total of seven credits available for the next interval. Whereas in fixed mode, the remaining two credits will not be available again and the counter is reset to five by the beginning of the next interval.

As packets arrive for a given class, the hardware component 100 may examine the packet size and divide it by $C_s$ to determine how many credits the packet is worth. It then may read the current value of the total counter K for that class. If the counter is larger than or equal to the number of credits the packets is worth, the packet is forwarded, otherwise the packet is dropped.

In a specific embodiment of the present invention, the software pre-selects the number of time intervals per second and the credit values for each traffic class. For a configured rate $R_c$, the number of credits C to be issued for each time interval is calculated and sent to the hardware. A dynamic rate adjustor 108 is designed to dynamically adjust the actual output rate by changing the number of credits issued per interval at runtime. The actual average output rate $R_s$ over time period T is sampled every $\Delta_t$ seconds and compared with the $R_c$. An increment of credit number $\Delta_c$, may then be computed by the software based on the rate difference $\Delta_r = R_c - R_s$. If the actual rate is less than the configured rate, $\Delta_c$ is positive. Otherwise, it is negative. The sum of C and $\Delta_c$ may then be sent to the hardware as the new credit allotment. This sampling and adjusting may continue until the actual output rate converges to the rate configured.

An example is provided herein to illustrate the functioning of the provided solution in accordance with a specific embodiment of the present invention. One of ordinary skill in the art will recognize that this is merely an example and the present invention should not be limited by it.

That hardware system may be designed such that the smallest available time interval is 0.0000192 sec. Thus, all configured intervals must be a multiple of that. Suppose pre-selected parameters as follows:

Credit Size $C_s$=64 bytes/sec=256 bits/sec

Time Interval $I$=32*0.0000192 sec=0.000614 sec

Number of time intervals $N_i$=1/0.0006144=1627 intervals/sec

If an output rate limiting policy of $R_c$=30,000,000 bits/sec is set, the number of credits C that should be issued for each time interval may be calculated as follows:

$C=R_c/(N_i*C_s*8)=30000000/(1627*64*8)=36=0x24$

Further assume there are four queues for each outgoing port. The mapping between each port and the traffic class for the port based rate limiting may be defined as:

Traffic Class=(port−1)*4+1.

For port and priority based rate limiting, the mapping may be:

Traffic Class=(port−1)*4+q q={1,2,3,4}, where q is the number of the priority queue.

Each rate limiting hardware component, such as a chip, may manage four ports. An output rate limiting policy configured on port 3 in module 1 (port 1/3) may be managed by the first chip in a module. The 9th traffic class in this chip may then be associated with the rate limiting policy. FIG. 2 is a diagram illustrating a table holding traffic class credit information in accordance with a specific embodiment of the present invention. 36 (0x24) credits may be issued for each time interval for port 3 managed by the chip. 0x1280000-0x1280200 may be the 128 credit register addresses used by the chip.

The default values for all registers may be 0x00000FFF, which is the maximum number of credits that can be issued per time interval. Before any packet is transmitted from port 1/3, the chip may examine credit register 0x1280020, which has a value of 0x24. If the packet size is less than $C*C_s=36*64$, it may be forwarded, otherwise it may be dropped.

Assume the actual output rate $R_s$ is 20,000,000 bits/sec. The difference of rate $\Delta_r$ and $\Delta_c$ may be calculated as:

$$\Delta_r = R_c - R_s = 30,000,000 - 20,000,000 = 10,000,000 \text{ bits/sec}.$$

$$\Delta_c = \Delta_r/(N_i * C_s * 8) = 10000000/(1627*64*8) = 12 = 0xC.$$

A new credit number of $C+\Delta_c=36+12=48$ (0x30) may then be set to the credit register at 0x1280020 200. The process may then repeat, while hopefully $\Delta_c$ will reach zero.

Figure 3:
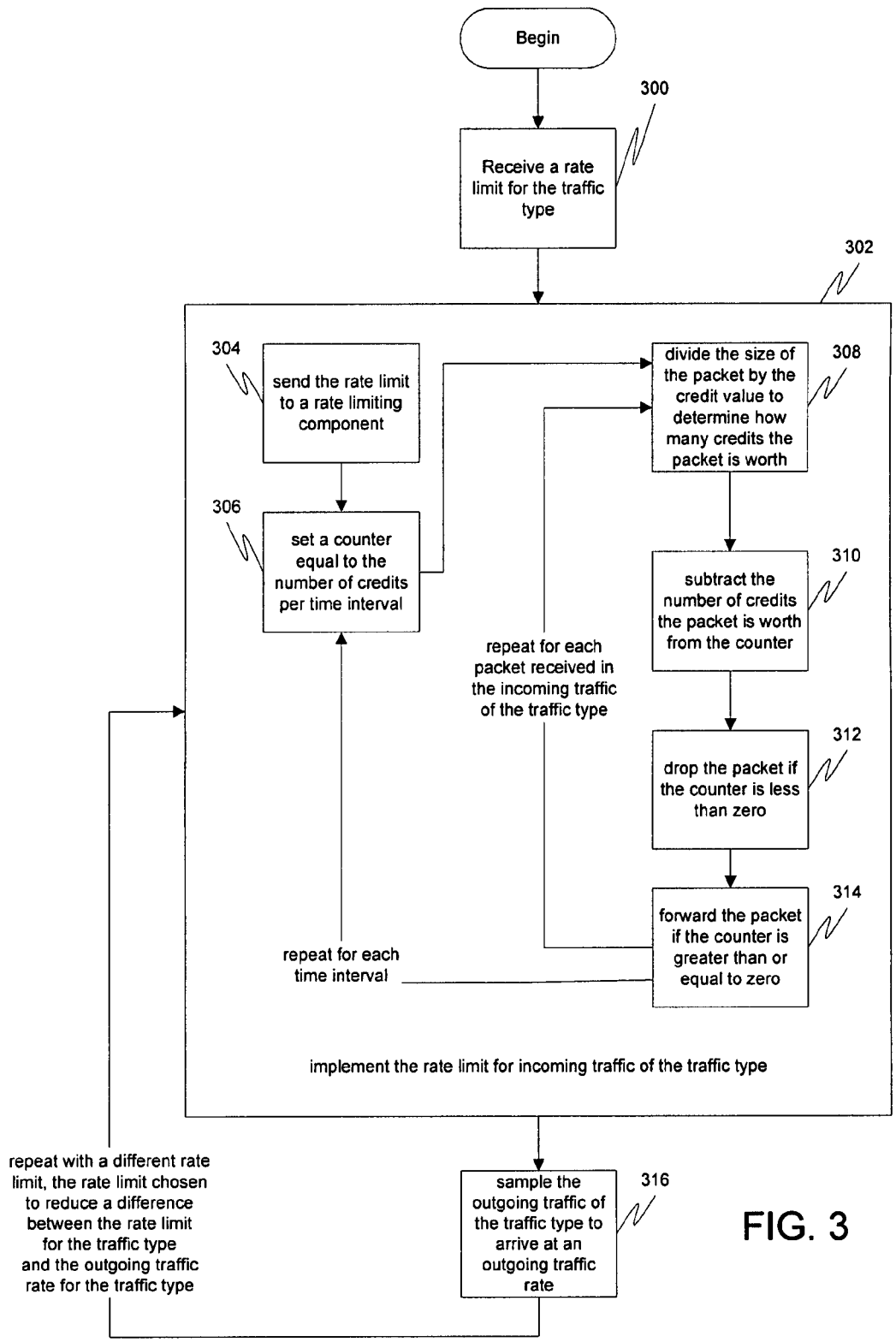
FIG. 3 is a flow diagram illustrating a method for dynamically limiting the rate of a traffic type through a network device using a fixed mode, wherein the network device has incoming traffic and outgoing traffic, in accordance with a specific embodiment of the present invention.

FIG. 3 is a flow diagram illustrating a method for dynamically limiting the rate of a traffic type through a network device using a fixed mode, wherein the network device has incoming traffic and outgoing traffic, in accordance with a specific embodiment of the present invention. At 300, a rate limit may be received for the traffic type. The rate limit may be a number of credits per time interval, multiplied by a number of bits per credit. Each credit may represent a fixed number of bits. The network device may have a credit value representing the size of each credit. The traffic type may be associated with a port, an outgoing queue for a port, or a flow pattern defined by an access control list (ACL) group.

At 302, the rate limit may be implemented for incoming traffic of the traffic type. This may comprise sending the rate limit to a rate limiting component at 304. For each time interval, 306-314 may be executed. At 306, a counter may be set equal to the number of credits per time interval. For each packet received in the incoming traffic of the traffic type, 308-314 may be executed. At 308, the size of the packet may be divided by the credit value to determine how many credits the packet is worth. At 310, the number of credits the packet is worth may be subtracted from the counter. At 312, the packet may be dropped if the counter is less than zero. Then the packet may be forwarded if the counter is greater than or equal to zero at 314.

At 316, the outgoing traffic of the traffic type may be sampled to arrive at an outgoing traffic rate. Sampling may comprise measuring the number of bits of the traffic type output each time interval. Then, the implementing 302 and sampling 316 may be repeated with a different rate limit, the different rate limit chosen to reduce a difference between the rate limit for the traffic type and said outgoing traffic rate for the traffic type. The different rate limit may be determined by subtracting the sampled number of bits output each time interval divided by the number of bits per credit from the rate limit and adding the difference to the rate limit.

Figure 4:
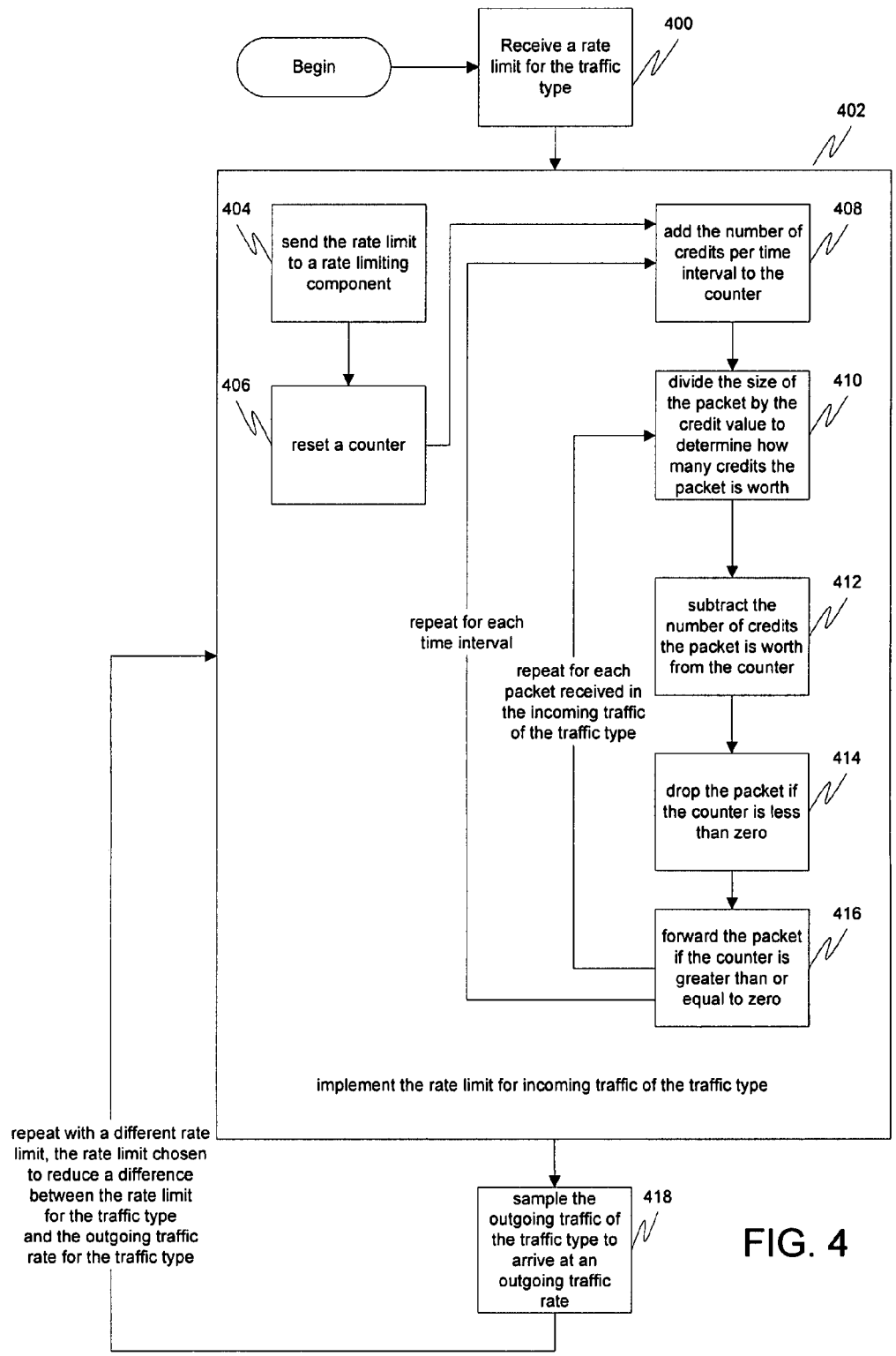
FIG. 4 is a flow diagram illustrating a method for dynamically limiting the rate of a traffic type through a network device using an accumulated mode, wherein the network device has incoming traffic and outgoing traffic, in accordance with a specific embodiment of the present invention.

FIG. 4 is a flow diagram illustrating a method for dynamically limiting the rate of a traffic type through a network device using an accumulated mode, wherein the network device has incoming traffic and outgoing traffic, in accordance with a specific embodiment of the present invention. At 400, a rate limit may be received for the traffic type. The rate limit may be a number of credits per time interval, multiplied by a number of bits per credit. Each credit may represent a fixed number of bits. The network device may have a credit value representing the size of each credit. The traffic type may be associated with a port, an outgoing queue for a port, or a flow pattern defined by an access control list (ACL) group.

At 402, the rate limit may be implemented for incoming traffic of the traffic type. This may comprise sending the rate limit to a rate limiting component at 404. This may comprise resetting a counter at 406. Then, for each time interval, 408-416 are executed. At 408, the number of credits per time interval may be added to the counter. For each packet received in the incoming traffic of the traffic type, 410-416 may be executed. At 410, the size of the packet may be divided by the credit value to determine how many credits the packet is worth. At 412, the number of credits the packet is worth may be subtracted from the counter. At 414, the packet may be dropped if the counter is less than zero. Then the packet may be forwarded if the counter is greater than or equal to zero at 416.

At 418, the outgoing traffic of the traffic type may be sampled to arrive at an outgoing traffic rate. Sampling may comprise measuring the number of bits of the traffic type output each time interval. The implementing 402 and sampling 418 may be repeated with a different rate limit, the different rate limit chosen to reduce a difference between the rate limit for the traffic type and said outgoing traffic rate for the traffic type. The different rate limit may be determined by subtracting the sampled number of bits output each time interval divided by the number of bits per credit from the rate limit and adding the difference to the rate limit.

Figure 5:
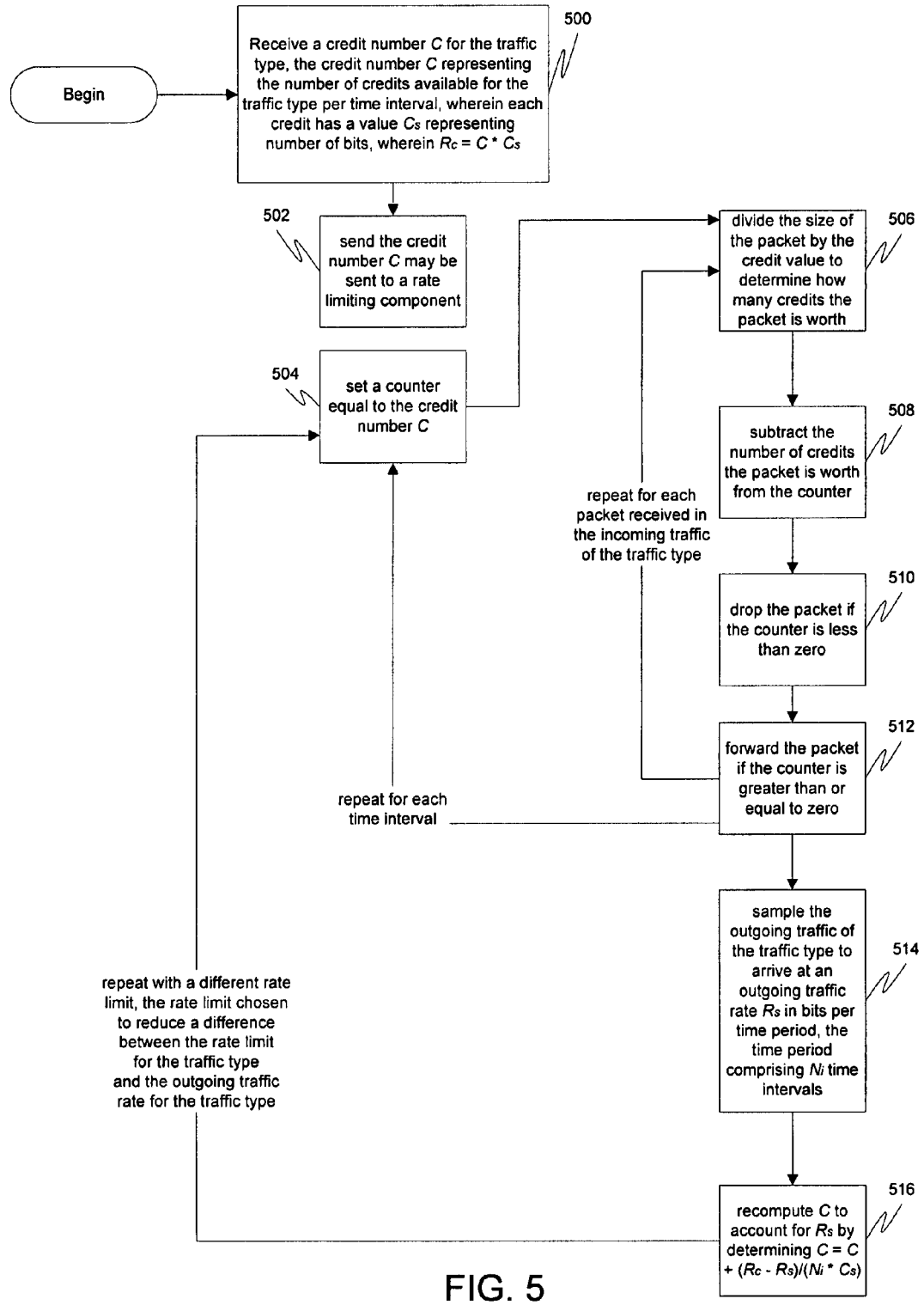
FIG. 5 is a flow diagram illustrating a method for dynamically limiting the rate of a traffic type through a network device using a fixed mode, wherein the network device has incoming traffic and outgoing traffic, in accordance with a specific embodiment of the present invention.

FIG. 5 is a flow diagram illustrating a method for dynamically limiting the rate of a traffic type through a network device using a fixed mode, wherein the network device has incoming traffic and outgoing traffic, in accordance with a specific embodiment of the present invention. At 500, a credit number C is received for the traffic type, the credit number C representing the number of credits available for the traffic type per time interval, wherein each credit has a value $C_s$ representing a predetermined number of bits, wherein $R_c = C * C_s * N_i$. The traffic type may be associated with a port, an outgoing queue for a port, or a flow pattern defined by an access control list (ACL) group. At 502, the credit number C may be sent to a rate limiting component. Then, for each time interval, 504-512 are executed. At 504, a counter may be set equal to the credit number C. For each packet received in the incoming traffic of the traffic type, 506-512 are executed. At 506, the size of the packet may be divided by the credit value to determine how many credits the packet is worth. At 508, this value may then be subtracted from the counter. At 510, the packet may be dropped if the counter is less than zero. At 512, the packet may be forwarded if the counter is greater than or equal to zero.

At 514, the outgoing traffic of the traffic type may be sampled to arrive at an outgoing traffic rate $R_s$ in bits per time period, the time period comprising $N_i$ time intervals. At 516, C may then be recomputed to account for $R_s$ by determining $C = C + (R_c - R_s)/(N_i * C_s)$. Then the setting 504, dividing 506, subtracting 508, dropping 510, forwarding 512, sampling 514, and recomputing 516 are all repeated with the recomputed credit number C.

Figure 6:
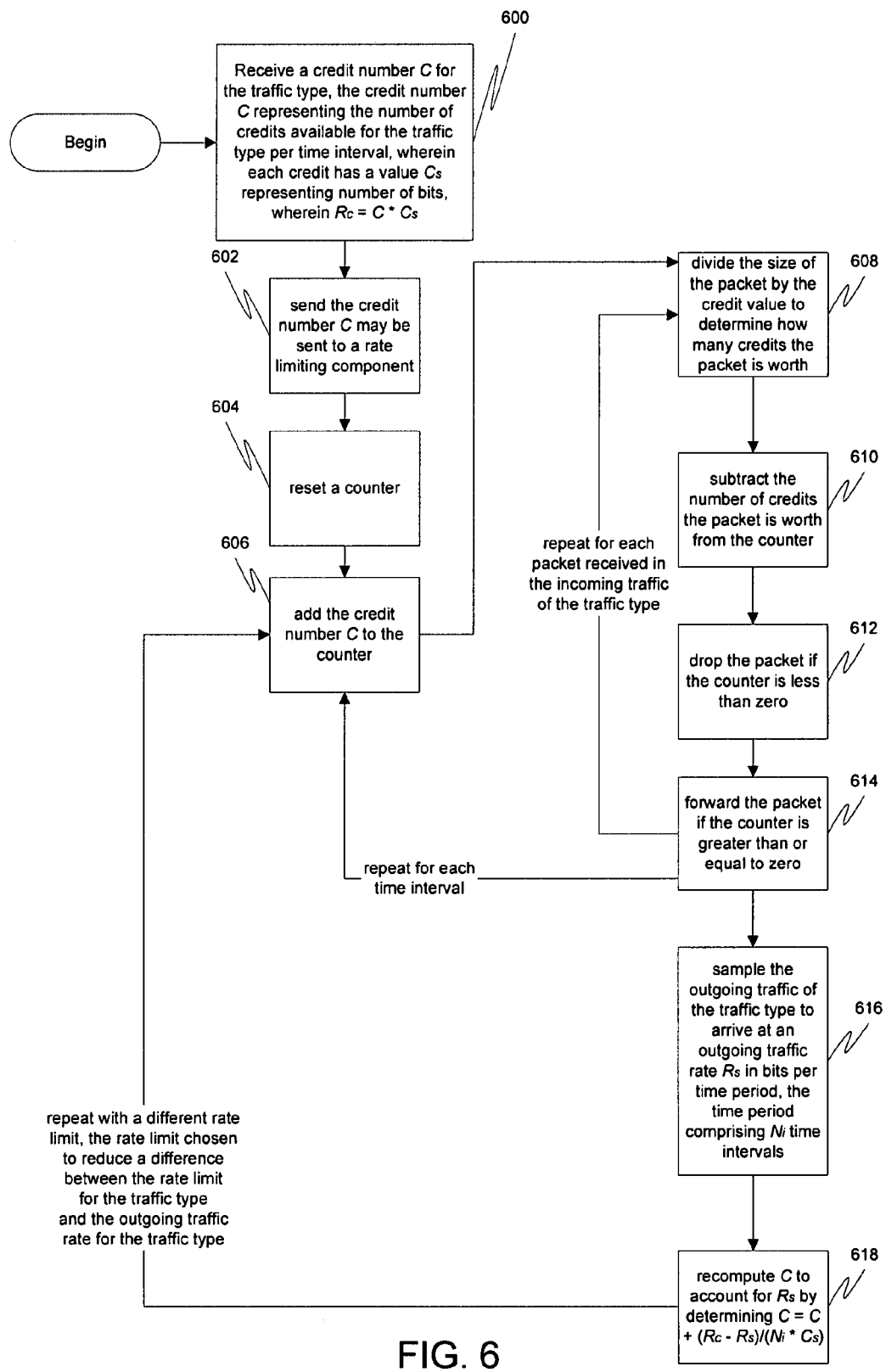
FIG. 6 is a flow diagram illustrating a method for dynamically limiting the rate of a traffic type through a network device using an accumulated mode, wherein the network device has incoming traffic and outgoing traffic, in accordance with a specific embodiment of the present invention.

FIG. 6 is a flow diagram illustrating a method for dynamically limiting the rate of a traffic type through a network device using an accumulated mode, wherein the network device has incoming traffic and outgoing traffic, in accordance with a specific embodiment of the present invention. At 600, a credit number C is received for the traffic type, the credit number C representing the number of credits available for the traffic type per time interval, wherein each credit has a value $C_s$ representing a predetermined number of bits, wherein $R_c=C*C_s*N_i$. The traffic type may be associated with a port, an outgoing queue for a port, or a flow pattern defined by an access control list (ACL) group. At 602, the credit number C may be sent to a rate limiting component. At 604, a counter may be reset. Then, for each time interval, 606-614 are executed. At 606, the credit number C may be added to the counter. For each packet received in the incoming traffic of the traffic type, 608-614 are executed. At 608, the size of the packet may be divided by the credit value to determine how many credits the packet is worth. At 610, this value may then be subtracted from the counter. At 612, the packet may be dropped if the counter is less than zero. At 614, the packet may be forwarded if the counter is greater than or equal to zero.

At 616, the outgoing traffic of the traffic type may be sampled to arrive at an outgoing traffic rate $R_s$ in bits per time period, the time period comprising $N_i$ time intervals. At 618, C may then be recomputed to account for $R_s$ by determining $C=C+(R_c-R_s)/(N_i*C_s)$. Then the resetting 604, adding 606, dividing 608, subtracting 610, dropping 612, forwarding 614, sampling 616, and recomputing 618 are all repeated with the recomputed credit number C.

Figure 7:
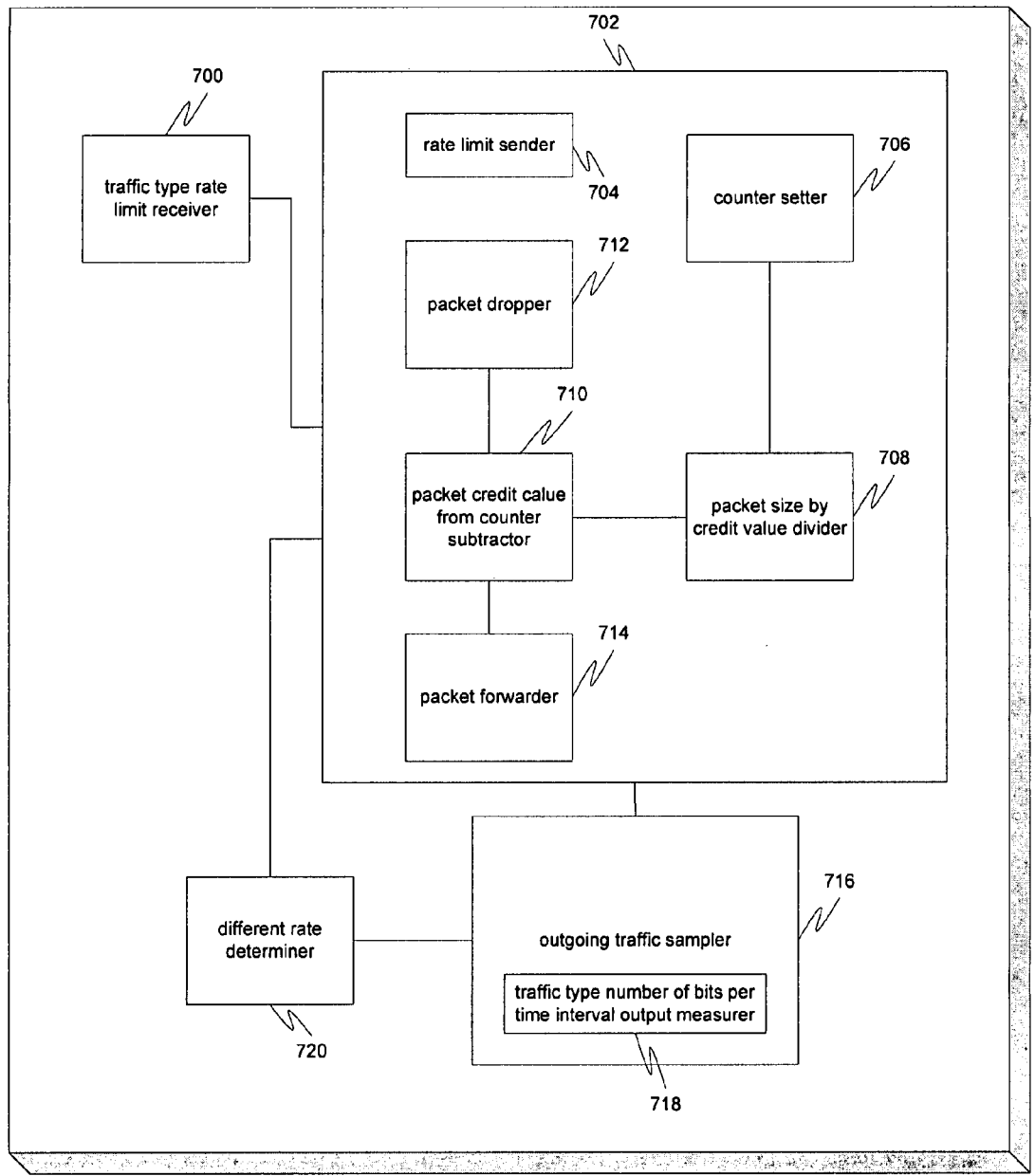
FIG. 7 is a block diagram illustrating an apparatus for dynamically limiting the rate of a traffic type through a network device using a fixed mode, wherein the network device has incoming traffic and outgoing traffic, in accordance with a specific embodiment of the present invention.

FIG. 7 is a block diagram illustrating an apparatus for dynamically limiting the rate of a traffic type through a network device using a fixed mode, wherein the network device has incoming traffic and outgoing traffic, in accordance with a specific embodiment of the present invention. A traffic type rate limit receiver 700 may receive a rate limit for the traffic type. The rate limit may be a number of credits per time interval, multiplied by a number of bits per credit. Each credit may represent a fixed number of bits. The network device may have a credit value representing the size of each credit. The traffic type may be associated with a port, an outgoing queue for a port, or a flow pattern defined by an access control list (ACL) group.

An incoming traffic rate limit implementer 702 coupled to the traffic type rate limit receiver 700 may implement the rate limit for incoming traffic of the traffic type. This may comprise sending the rate limit to a rate limiting component using a rate sender 704. For each time interval, the following may be executed. A counter setter 706 may set a counter equal to the number of credits per time interval. For each packet received in the incoming traffic of the traffic type, the following may also be executed. A packet size by credit value divider 708 coupled to the counter setter 706 may divide the size of the packet by the credit value to determine how many credits the packet is worth. A packet credit value from counter subtractor 710 coupled to the packet size by credit value divider 708 may subtract the number of credits the packet is worth from the counter. A packet dropper 712 coupled to the packet credit value from counter subtractor 710 may drop the packet if the counter is less than zero. A packet forwarder 714 coupled to the packet credit value from counter subtractor 710 may forward the packet if the counter is greater than or equal to zero.

An outgoing traffic sampler 716 coupled to the incoming traffic rate limit implementer may sample the outgoing traffic of the traffic type to arrive at an outgoing traffic rate. Sampling may comprise measuring the number of bits of the traffic type output each time interval using a traffic type number of bits per time interval output measurer 718. Then, the implementing and sampling may be repeated with a different rate limit computed using a different rate limit determiner 720 coupled to the traffic type number of bits per time interval output measurer 718 and to the incoming traffic rate limit implementer 702, the different rate limit chosen to reduce a difference between the rate limit for the traffic type and said outgoing traffic rate for the traffic type. The different rate limit may be determined by subtracting the sampled number of bits output each time interval divided by the number of bits per credit from the rate limit and adding the difference to the rate limit.

Figure 8:
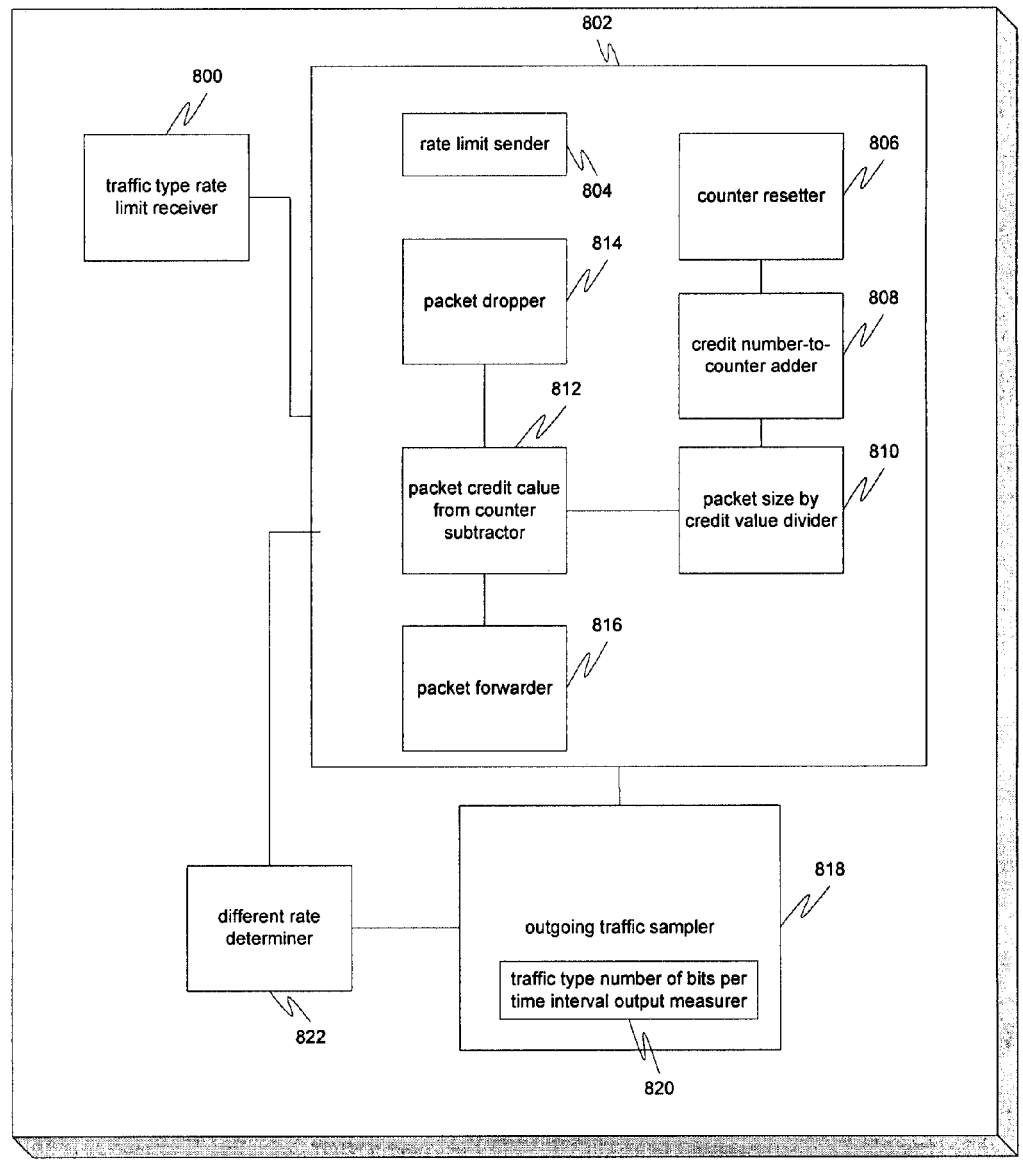
FIG. 8 is a block diagram illustrating an apparatus for dynamically limiting the rate of a traffic type through a network device using an accumulated mode, wherein the network device has incoming traffic and outgoing traffic, in accordance with a specific embodiment of the present invention.

FIG. 8 is a block diagram illustrating an apparatus for dynamically limiting the rate of a traffic type through a network device using an accumulated mode, wherein the network device has incoming traffic and outgoing traffic, in accordance with a specific embodiment of the present invention. A traffic type rate limit receiver 800 may receive a rate limit for the traffic type. The rate limit may be a number of credits per time interval, multiplied by a number of bits per credit. Each credit may represent a fixed number of bits. The network device may have a credit value representing the size of each credit. The traffic type may be associated with a port, an outgoing queue for a port, or a flow pattern defined by an access control list (ACL) group.

An incoming traffic rate limit implementer 802 coupled to the traffic type rate limit receiver 800 may implement the rate limit for incoming traffic of the traffic type. This may comprise sending the rate limit to a rate limiting component using a rate limit sender 804. This may also comprise resetting a counter using a counter resetter 806. Then, for each time interval, the following may be executed. A credit number-to-counter adder 808 coupled to the counter resetter 806 may add the number of credits per time interval to the counter. For each packet received in the incoming traffic of the traffic type, the following may also be executed. A packet size by credit value divider 810 coupled to the credit number-to-counter adder 808 may divide the size of the packet by the credit value to determine how many credits the packet is worth. A packet credit value from counter subtractor 812 coupled to the packet size by credit value divider 810 may subtract the number of credits the packet is worth from the counter. A packet dropper 814 coupled to the packet credit value from counter subtractor 812 may drop the packet if the counter is less than zero. A packet forwarder 816 coupled to the packet credit value from counter subtractor 812 may forward the packet if the counter is greater than or equal to zero.

An outgoing traffic sampler 818 coupled to the incoming traffic rate limit implementer 802 may sample the outgoing traffic of the traffic type to arrive at an outgoing traffic rate. Sampling may comprise measuring the number of bits of the traffic type output each time interval using a traffic type number of bits per time interval output measurer 820. The implementing and sampling may be repeated with a different rate limit determined using a different rate limit determiner 822 coupled to the traffic type number of bits per time interval output measurer 820 and to the incoming traffic rate limit implementer 802, the different rate limit chosen to reduce a difference between the rate limit for the traffic type and said outgoing traffic rate for the traffic type. The different rate limit may be determined by subtracting the sampled number of bits output each time interval divided by the number of bits per credit from the rate limit and adding the difference to the rate limit.

Figure 9:
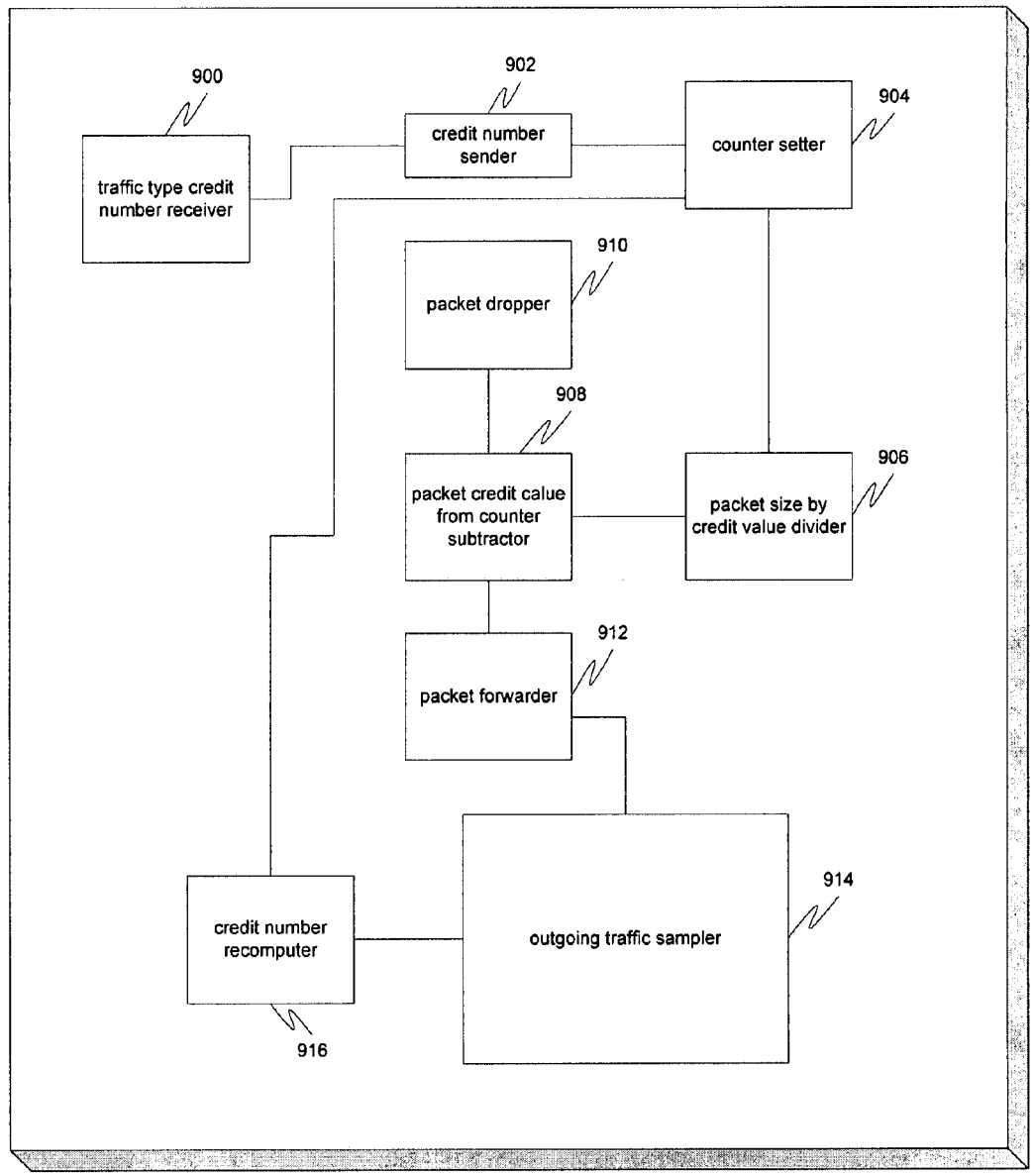
FIG. 9 is a block diagram illustrating an apparatus for dynamically limiting the rate of a traffic type through a network device using a fixed mode, wherein the network device has incoming traffic and outgoing traffic, in accordance with a specific embodiment of the present invention.

FIG. 9 is a block diagram illustrating an apparatus for dynamically limiting the rate of a traffic type through a network device using a fixed mode, wherein the network device has incoming traffic and outgoing traffic, in accordance with a specific embodiment of the present invention. A traffic type credit number receiver 900 may receive a credit number C for the traffic type, the credit number C representing the number of credits available for the traffic type per time interval, wherein each credit has a value $C_s$ representing a predetermined number of bits, wherein $R_c=C*C_s*N_i$. The traffic type may be associated with a port, an outgoing queue for a port, or a flow pattern defined by an access control list (ACL) group. A credit number sender 902 coupled to the traffic type credit number receiver 900 may send the credit number C to a rate limiting component. Then, for each time interval, the following are executed. A counter setter 904 coupled to the traffic type credit number receiver 900 may set a counter equal to the credit number C. For each packet received in the incoming traffic of the traffic type, the following may also be executed. A packet size by credit value divider 906 coupled to the counter setter 904 may divide the size of the packet by the credit value to determine how many credits the packet is worth. A packet credit value from counter subtractor 908 coupled to the packet size by credit value divider 906 may subtract this value from the counter. A packet dropper 910 coupled to the packet credit value from counter subtractor 908 may drop the packet if the counter is less than zero. A packet forwarder 912 coupled to the packet credit value from counter subtractor 908 may forward the packet if the counter is greater than or equal to zero.

An outgoing traffic sampler 914 may sample the outgoing traffic of the traffic type to arrive at an outgoing traffic rate $R_s$ in bits per time period, the time period comprising $N_i$ time intervals. A credit number recomputer 916 coupled to the outgoing traffic sampler 914 and to the counter setter 904 may recompute C to account for $R_s$ by determining $C=C+(R_c-R_s)/(N_i*C_s)$. Then the setting, dividing, subtracting, dropping, forwarding, sampling, and recomputing may all be repeated with the recomputed credit number C.

Figure 10:
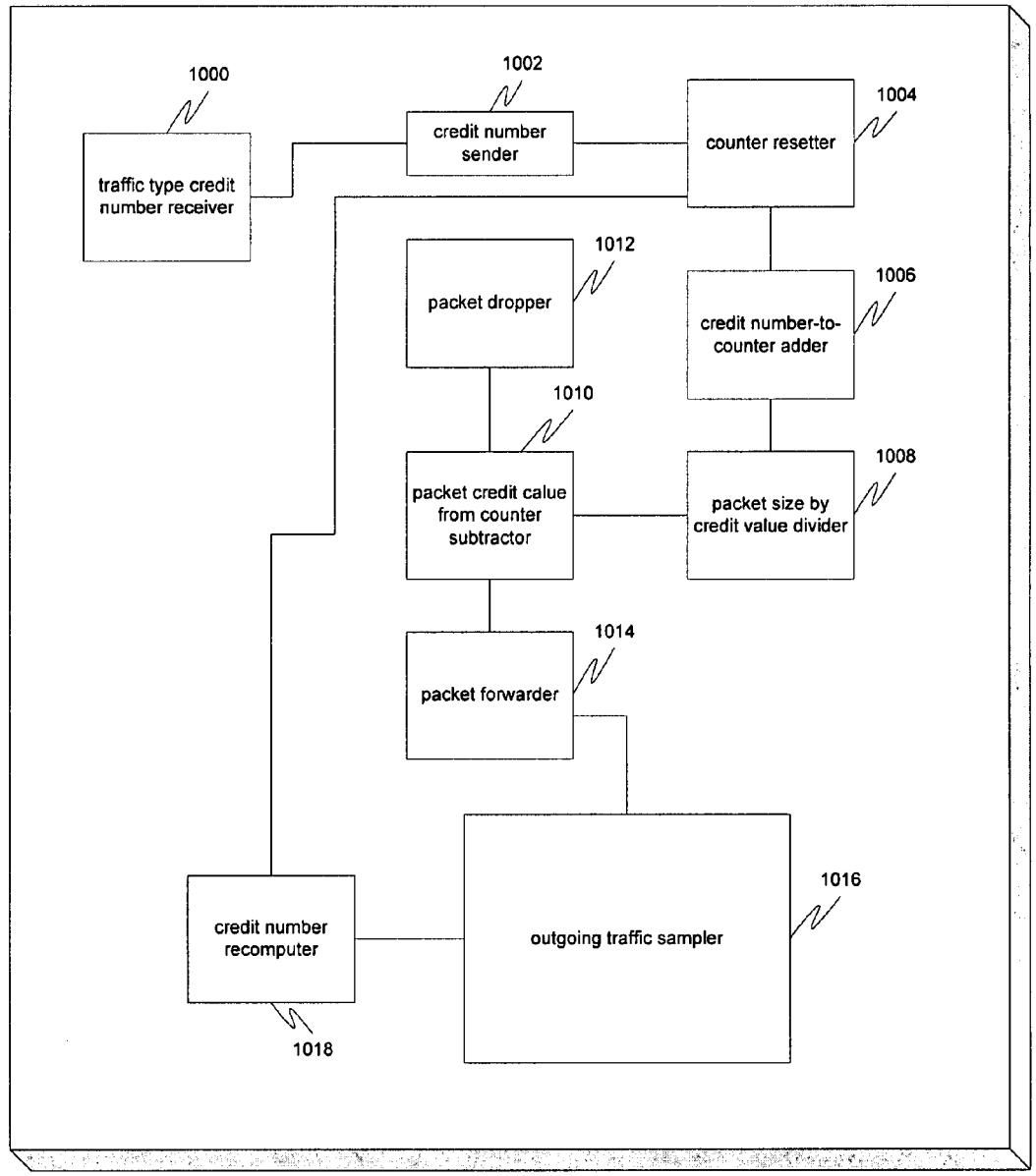
FIG. 10 is a block diagram illustrating an apparatus for dynamically limiting the rate of a traffic type through a network device using an accumulated mode, wherein the network device has incoming traffic and outgoing traffic, in accordance with a specific embodiment of the present invention.

FIG. 10 is a block diagram illustrating an apparatus for dynamically limiting the rate of a traffic type through a network device using an accumulated mode, wherein the network device has incoming traffic and outgoing traffic, in accordance with a specific embodiment of the present invention. A traffic type credit number receiver 1000 may receive a credit number C for the traffic type, the credit number C representing the number of credits available for the traffic type per time interval, wherein each credit has a value $C_s$ representing a predetermined number of bits, wherein $R_c=C*C_s*N_i$. The traffic type may be associated with a port, an outgoing queue for a port, or a flow pattern defined by an access control list (ACL) group. A credit number sender 1002 coupled to the traffic type credit number receiver 1000 may send the credit number C to a rate limiting component. A counter resetter 1004 coupled to the traffic type credit number receiver 1000 may reset a counter. Then, for each time interval, the following may be executed. A credit number-to-counter adder 1006 coupled to the counter resetter 1004 may add the credit number C to the counter. For each packet received in the incoming traffic of the traffic type, the following may also be executed. A packet size by credit value divider 1008 coupled to the credit number-to-counter adder 1006 may divide the size of the packet by the credit value to determine how many credits the packet is worth. A packet credit value from counter subtractor 1010 coupled to the packet size by credit value divider 1008 may subtract this value from the counter. A packet dropper 1012 coupled to the packet credit value from counter subtractor 1010 may drop the packet if the counter is less than zero. A packet forwarder 1014 coupled to the packet credit value from counter subtractor 1010 may forward the packet if the counter is greater than or equal to zero.

An outgoing traffic sampler 1016 may sample the outgoing traffic of the traffic type to arrive at an outgoing traffic rate $R_s$ in bits per time period, the time period comprising $N_i$ time intervals. A credit number recomputer 1018 coupled to the outgoing traffic sampler 1016 and to the counter setter 1004 may recompute C to account for $R_s$ by determining $C=C+(R_c-R_s)/(N_i*C_s)$. Then the resetting, adding, dividing, subtracting, dropping, forwarding, sampling, and recomputing are all repeated with the recomputed credit number C.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An apparatus comprising:
   an incoming traffic rate limit implementer configured to implement a rate limit for incoming traffic of a traffic type through the apparatus; and
   an outgoing traffic sampler coupled to the incoming traffic rate limit implementer and configured to sample the outgoing traffic of the traffic type to arrive at an outgoing traffic rate, the apparatus configured to repeat implementing and sampling with the rate limit set to a new rate limit, the new rate limit chosen to reduce a difference between the rate limit for the traffic type and the outgoing rate for the traffic type.

2. The apparatus of claim 1 wherein the incoming traffic and the outgoing traffic comprise network traffic.

3. The apparatus of claim 1 wherein the apparatus comprises a network switch or a network router.

4. The apparatus of claim 1 wherein the incoming traffic rate limit implementer comprises a rate limit sender configured to send the rate limit to a rate limiting component.

5. The apparatus of claim 1 wherein the outgoing traffic sampler comprises a traffic type number of bits per time interval output measurer configured to measure the number of bits of the traffic type output each time interval.

6. The apparatus of claim 5 wherein the outgoing traffic sampler further comprises a different rate limit determiner coupled to the traffic type number of bits per time interval output measurer and configured to determine a different rate limit by subtracting the sampled number of bits output each time interval by the number of bits per credit from the rate limit and adding the difference to the rate limit.

7. The apparatus of claim 1 wherein the traffic type is associated with one or more ports of the apparatus.

8. An apparatus comprising:
   a traffic type rate limit receiver configured to receive a rate limit for a traffic type through the apparatus;
   an incoming traffic rate limit implementer coupled to the traffic type rate limit receiver and configured to implement the rate limit for incoming traffic of the traffic type; and
   an outgoing traffic sampler coupled to the incoming traffic rate limit implementer and configured to sample the outgoing traffic of the traffic type to arrive at an outgoing traffic rate, the apparatus configured to repeat implementing and sampling with the rate limit set to a new rate limit, the new rate limit chosen to reduce a difference between the rate limit for the traffic type and the outgoing rate for the traffic type.

9. The apparatus of claim 8 wherein the incoming traffic and the outgoing traffic comprise network traffic.

10. The apparatus of claim 8 wherein the apparatus comprises a network switch or a network router.

11. The apparatus of claim 8 wherein the incoming traffic rate limit implementer comprises a rate limit sender configured to send the rate limit to a rate limiting component.

12. The apparatus of claim 8 wherein the outgoing traffic sampler comprises a traffic type number of bits per time interval output measurer configured to measure the number of bits of the traffic type output each time interval.

13. The apparatus of claim 12 wherein the outgoing traffic sampler further comprises a different rate limit determiner coupled to the traffic type number of bits per time interval output measurer and configured to determine a different rate limit by subtracting the sampled number of bits output each time interval by the number of bits per credit from the rate limit and adding the difference to the rate limit.

14. The apparatus of claim 8 wherein the traffic type is associated with an outgoing queue for one or more ports of the apparatus.

15. An apparatus comprising:
a memory; and
one or more processors configured to:
 receive a rate limit for a traffic type through the apparatus;
 implement the rate limit for incoming traffic of the traffic type;
 sample the outgoing traffic of the traffic type to arrive at an outgoing traffic rate; and
 repeat implementing and sampling with the rate limit set to a new rate limit, the new rate limit chosen to reduce a difference between the rate limit for the traffic type and the outgoing rate for the traffic type.

16. The apparatus of claim 15 wherein the incoming traffic and the outgoing traffic comprise network traffic.

17. The apparatus of claim 15 wherein the apparatus comprises a network switch or a network router.

18. The apparatus of claim 15 wherein processor is further configured to measure the number of bits of the traffic type output each time interval.

19. The apparatus of claim 18 wherein the processor is further configured to determine a different rate limit by subtracting the sampled number of bits output each time interval by the number of bits per credit from the rate limit and adding the difference to the rate limit.

20. The apparatus of claim 15 wherein the traffic type is associated with a flow pattern defined by an access control list (ACL) group.

\* \* \* \* \*